(12) United States Patent
Walmsley et al.

(10) Patent No.: US 7,025,279 B2
(45) Date of Patent: *Apr. 11, 2006

(54) METHOD FOR GENERATING TAGS

(75) Inventors: Simon Robert Walmsley, Balmain (AU); Paul Lapstun, Balmain (AU)

(73) Assignee: Silverbrook Research Pty Ltd, Balmain (AU)

(*) Notice: Subject to any disclaimer, the term of this patent is extended or adjusted under 35 U.S.C. 154(b) by 58 days.

This patent is subject to a terminal disclaimer.

(21) Appl. No.: 10/664,941

(22) Filed: Sep. 22, 2003

(65) Prior Publication Data

US 2004/0060992 A1 Apr. 1, 2004

Related U.S. Application Data

(63) Continuation of application No. 09/606,999, filed on Jun. 30, 2000, now Pat. No. 6,622,923.

(51) Int. Cl.
*G06K 7/10* (2006.01)

(52) U.S. Cl. .................. 235/494; 235/462.01

(58) Field of Classification Search ................ 235/462.01–462.45, 494, 454, 455, 470, 235/488, 375, 472.01, 472.02, 472.03
See application file for complete search history.

(56) References Cited

U.S. PATENT DOCUMENTS

| | | | |
|---|---|---|---|
| 5,288,986 A | 2/1994 | Pine et al. | |
| 5,343,031 A | 8/1994 | Yoshida | |
| 5,384,451 A * | 1/1995 | Smith et al. | 235/462.1 |
| 5,404,003 A * | 4/1995 | Smith | 235/462.1 |
| 5,410,620 A | 4/1995 | Yoshida | |
| 5,477,012 A | 12/1995 | Sekendur | |
| 5,591,956 A | 1/1997 | Longacre, Jr. et al. | |
| 5,602,382 A * | 2/1997 | Ulvr et al. | 235/462.02 |
| 5,661,506 A | 8/1997 | Lazzouni et al. | |
| 5,719,384 A * | 2/1998 | Ju et al. | 235/462.1 |
| 5,726,435 A | 3/1998 | Hara et al. | |
| 5,818,032 A * | 10/1998 | Sun et al. | 235/494 |
| 5,866,895 A | 2/1999 | Fukuda et al. | |
| 6,000,614 A | 12/1999 | Yang et al. | |
| 6,098,882 A * | 8/2000 | Antognini et al. | 235/454 |
| 6,131,807 A | 10/2000 | Fukuda et al. | |
| 6,176,427 B1 * | 1/2001 | Antognini et al. | 235/454 |
| 6,540,141 B1 * | 4/2003 | Dougherty et al. | 235/462.01 |
| 6,622,923 B1 * | 9/2003 | Walmsley et al. | 235/494 |
| 2004/0094632 A1 * | 5/2004 | Alleshouse | 235/494 |

FOREIGN PATENT DOCUMENTS

WO   WO 99/50787   10/1999

OTHER PUBLICATIONS

U.S. Appl. No. 09/606,999, Walmsley et al.

* cited by examiner

*Primary Examiner*—Thien M. Le

(57) ABSTRACT

A generic data package template is described that allows data to be encoded and printed in any arbitrary shape using an arbitrary encoding scheme. The template comprises an arbitrary shaped constant background pattern that is read to locate and orient a data area. The data are contains a plurality of dots that are decoded to extract the stored information.

20 Claims, 7 Drawing Sheets

METHOD FOR GENERATING TAGS

This is a continuation application of U.S. Ser. No. 09/606,999 filed on Jun. 30, 2000, now issued U.S. Pat. No. 6,622,923.

FIELD OF THE INVENTION

This invention relates to a data package template, tag, with data embedding.

In particular, although not exclusively, it relates to a dot based data package template format structure, or tag format structure (TFS).

BACKGROUND TO THE INVENTION

Various methods, systems and apparatus relating to the present invention are disclosed in the following co-pending applications filed by the Applicant or Assignee of the present invention on 23 May 2000:

| | | | |
|---|---|---|---|
| 09/575,197, | 09/575,195, | 09/575,159, | 09/575,132, |
| 09/575,123, | 09/575,148, | 09/575,130, | 09/575,165, |
| 09/575,153, | 09/575,118, | 09/575,131, | 09/575,116, |
| 09/575,144, | 09/575,139, | 09/575,186, | 09/575,185, |
| 09/575,191, | 09/575,145, | 09/575,192, | 09/609,303, |
| 09/610,095, | 09/609,596, | 09/575,181, | 09/575,193, |
| 09/575,156, | 09/575,183, | 09/575,160, | 09/575,150, |
| 09/575,169, | 09/575,184, | 6,502,614, | 09/575,180, |
| 09/575,149, | 6,549,935, | 09/575,187, | 09/575,155, |
| 6,591,884, | 6,439,706, | 09/575,196, | 09/575,198, |
| 09/575,178, | 6,428,155, | 09/575,146, | 09/608,920, |
| 09/575,174, | 09/575,163, | 09/575,168, | 09/575,154, |
| 09/575,129, | 09/575,124, | 09/575,188, | 09/575,189, |
| 09/575,162, | 09/575,172, | 09/575,170, | 09/575,171, |
| 09/575,161, | 10/291,716, | 6,428,133, | 6,526,658, |
| 6,315,399, | 6,338,548, | 6,540,319, | 6,328,431, |
| 6,328,425, | 09/575,127, | 6,383,833, | 6,464,332, |
| 6,439,693, | 6,390,591, | 09/575,152, | 6,328,417, |
| 6,409,323, | 09/575,114, | 6,604,810, | 6,318,920, |
| 6,488,422, | 09/575,108, | 09/575,109 | 09/575,110. |

In addition, various methods, systems and apparatus relating to the present invention are disclosed in the following co-pending U.S. patent applications filed simultaneously by the applicant or assignee of the present invention: Ser. No. 09/607,985, U.S. Pat. Nos. 6,398,332, 6,394,573.

The disclosures of these co-pending applications are incorporated herein by cross-reference. Each application is temporarily identified by its docket number, which will be replaced by the corresponding U.S. Ser. No. when available.

Of particular relevance is U.S. patent application entitled "Printed Page Tag Encoder", hereafter referred to by reference Ser. No. 09/575,109.

Nowadays, nearly every item purchased from a shop contains a barcode of some description on the packaging. The barcode provides a convenient way of identifying an object by a product number. The exact interpretation of the product number depends on the type of barcode. Warehouse inventory tracking systems let users define their own product number ranges, while inventories in shops must be more universally encoded so that products from one company don't overlap with products from another company.

Barcodes themselves have been specified in a large number of formats. The older barcode formats contain characters that are displayed in the form of lines. The combination of black and white lines describe the information the barcodes contains. Often there are two types of lines to form the complete barcode: the characters (the information itself and lines to separate blocks for better optical recognition. While the information may change from barcode to barcode, the lines to separate blocks stay constant. The lines to separate blocks can therefore be thought of as part of the constant structural components of the barcode.

Barcodes are read with specialized reading devices, such as lightpens, gun readers and scanners, that pass the extracted data onto a computer for further processing.

To help ensure that the extracted data was read correctly, checksums were introduced as a crude form of error detection. More recent barcode formats use redundancy encoding schemes such as Reed-Solomon. Such a scheme is utilized in the Aztec 2D barcode as disclosed U.S. Pat. No. 5,591,956. Often the degree of redundancy encoding is user selectable.

Two dimensional barcodes have been developed in which the information is encoded in two dimensions, instead of storing the information as a series of lines where the data is extracted from a single dimension. Just as with the original barcodes, the 2D barcode contains both information and structural components for better optical recognition. FIG. 1 shows an example of a Quick Response (QR) Code, developed by Denso of Japan and disclosed in U.S. Pat. No. 5,726,435. Note the barcode cell is comprised of two areas: a data area (depending on the data being stored in the barcode), and a constant position detection pattern. The constant position detection pattern is used by the reader to help locate the cell itself, then to locate the cell boundaries, to allow the reader to determine the original orientation of the cell. The orientation can be determined by the fact that there is no 4th corner pattern.

One problem associated with the range of barcodes available is that hardware for producing these barcodes is specific to the particular barcode format. As printers become more and more embedded, there is an increasing desire for real-time printing of these barcodes.

OBJECT OF THE INVENTION

It is an object of the present invention to provide a data package template with data embedding.

It is a further object of the invention to provide a generic tag format structure that supports generic encoding schemes.

Other objects of the present invention will be evident from the following discussion.

SUMMARY OF THE INVENTION

In one form, although it need not be the only, or indeed the broadest, form, the invention resides in a generic data package template for representing data formed from a plurality of dots, said data package template comprising:

an arbitrarily shaped constant background pattern formed from a plurality of dots and/or blanks; and at least one arbitrarily shaped data area;

said data area containing data dots located at positions determined by an encoding scheme.

In another form, the invention resides in a method of packaging data in a generic data package template formed from a plurality of dots, the method including the steps of:

constructing a bit array of entries for each dot position within said data package, said array of entries defining whether each said dot is part of an arbitrarily shaped constant background pattern or an arbitrarily shaped data area;

encoding said data for storage in said data area; and printing said plurality of dots encoded with said data.

BRIEF DESCRIPTION OF THE DRAWINGS

In order that the invention may be more fully understood and put into practical effect, preferred embodiments of the invention will now be described, by way of example only, and with reference to the accompanying drawings, wherein.

DETAILED DESCRIPTION OF THE PREFERRED EMBODIMENT

In this application the term tag is used to refer to the combination of data and any other components (such as a position detection pattern, a blank space, a surround, or the like), that must be rendered to help hold, locate or read data. A tag therefore contains the following components:

at least one data area. The data area is the reason for the tag. The tag data area(s) contains the encoded data (optionally redundancy-encoded, perhaps simply check—summed). The bits of the data are placed within the data area at locations specified by a tag encoding scheme.

constant background patterns, which typically includes a constant position detection pattern. These help a tag reader to locate the tag. They include components that are easy to locate and may contain orientation and perspective information in the case of 2D tags. Constant background patterns may also include such patterns as a blank area surrounding the data area or position detection pattern. These blank patterns may aid in the decoding of the data by ensuring that there is no interference between data areas.

For ease of description the data package template will be described in terms of common optical recognition, such as bar code scanners and the like. It will be appreciated that the concepts are equally applicable to tactile recognition, and possibly even aural recognition.

In most tag encoding schemes there is at least some constant background pattern, but it is not necessarily required by all. For example, if the tag data area is enclosed by a physical space and the reading means uses a non-optical location mechanism (e.g. physical alignment of surface to data reader) then a position detection pattern is not required.

Figure 1:
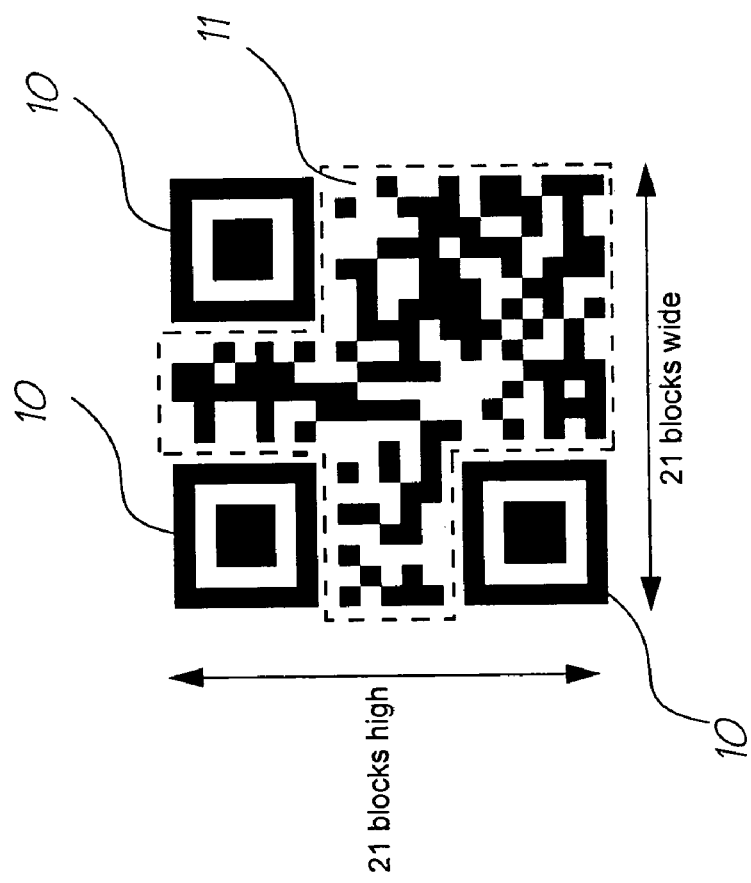
FIG. 1 shows a prior art two dimensional quick response code.
Figure 3:
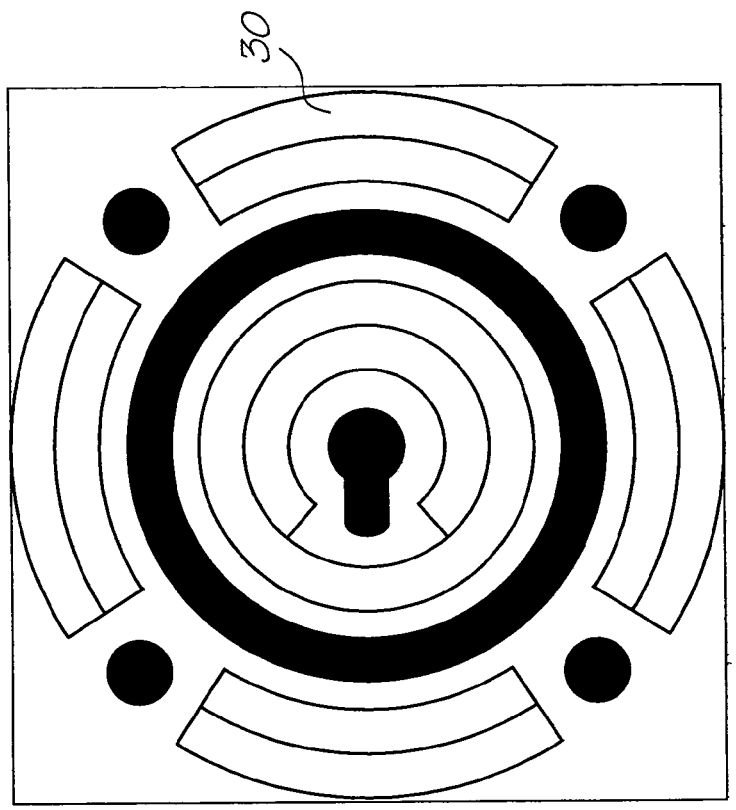
FIG. 3 shows data areas within the Netpage tag shown in FIG. 2.
Figure 2:
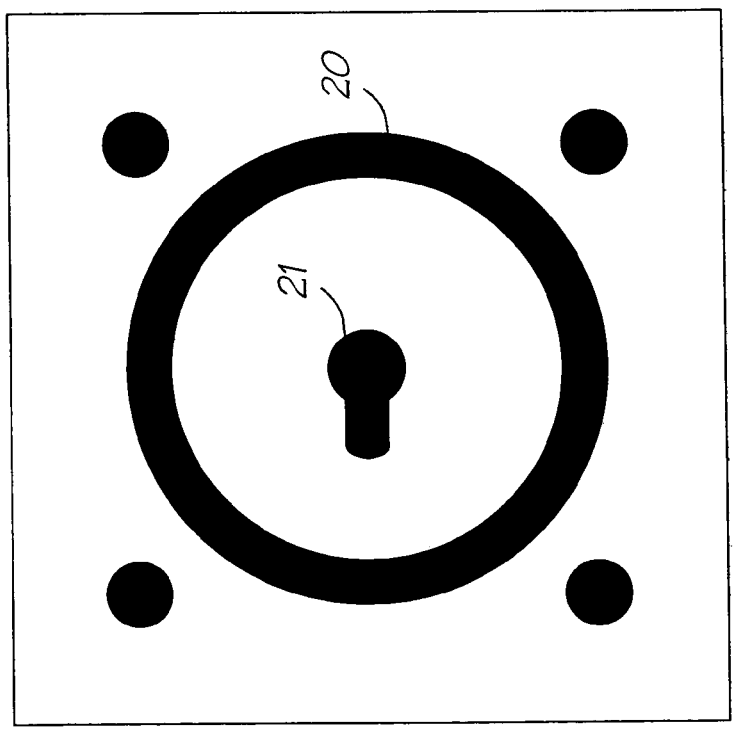
FIG. 2 shows a Netpage tag background pattern.
Figure 4:
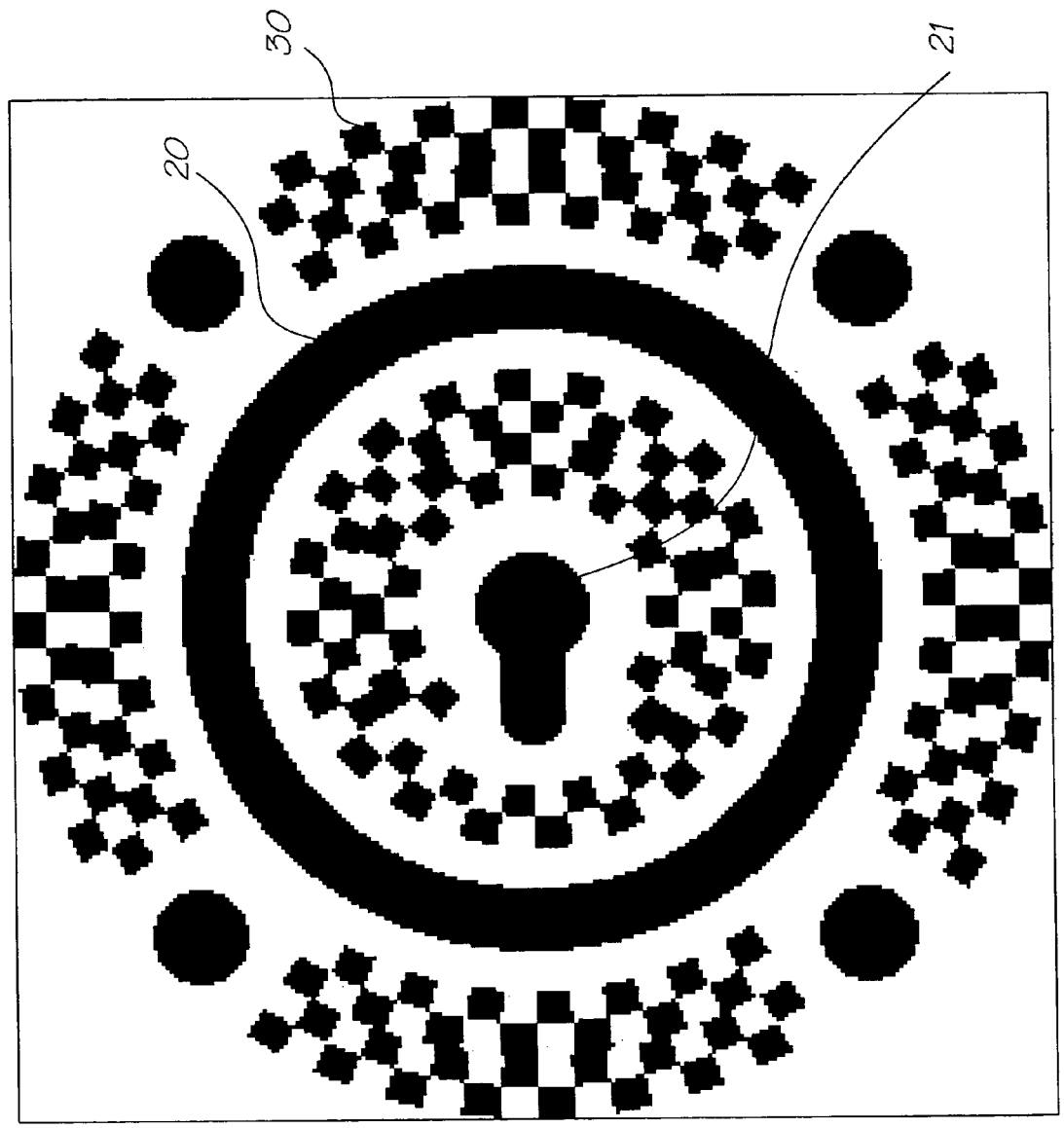
FIG. 4 is a magnified view of the Netpage tag with data rendered at 1600 dpi.

Different tag encoding schemes have different sized tags, and allocate the physical tag area to constant position detection pattern and data area differently. For example, the QR code, as shown in FIG. 1, has 3 fixed blocks 10 at the edges of the tag for position detection pattern and a data area 11 in the remainder. By contrast, the Netpage tag structure shown in FIGS. 2, 3, and 4 contains a circular locator component 20, an orientation component 21, and several data areas. FIG. 2 shows the Netpage tag constant background pattern in a resolution independant form. FIG. 3 is the same as FIG. 2, but with the addition of the data areas 30 to the Netpage tag. FIG. 4 is an example of dot placement and rendering to 1600 dpi for a Netpage tag. In FIG. 4 a single bit of data is represented by many physical output dots to form a block within the data area.

Figure 5:
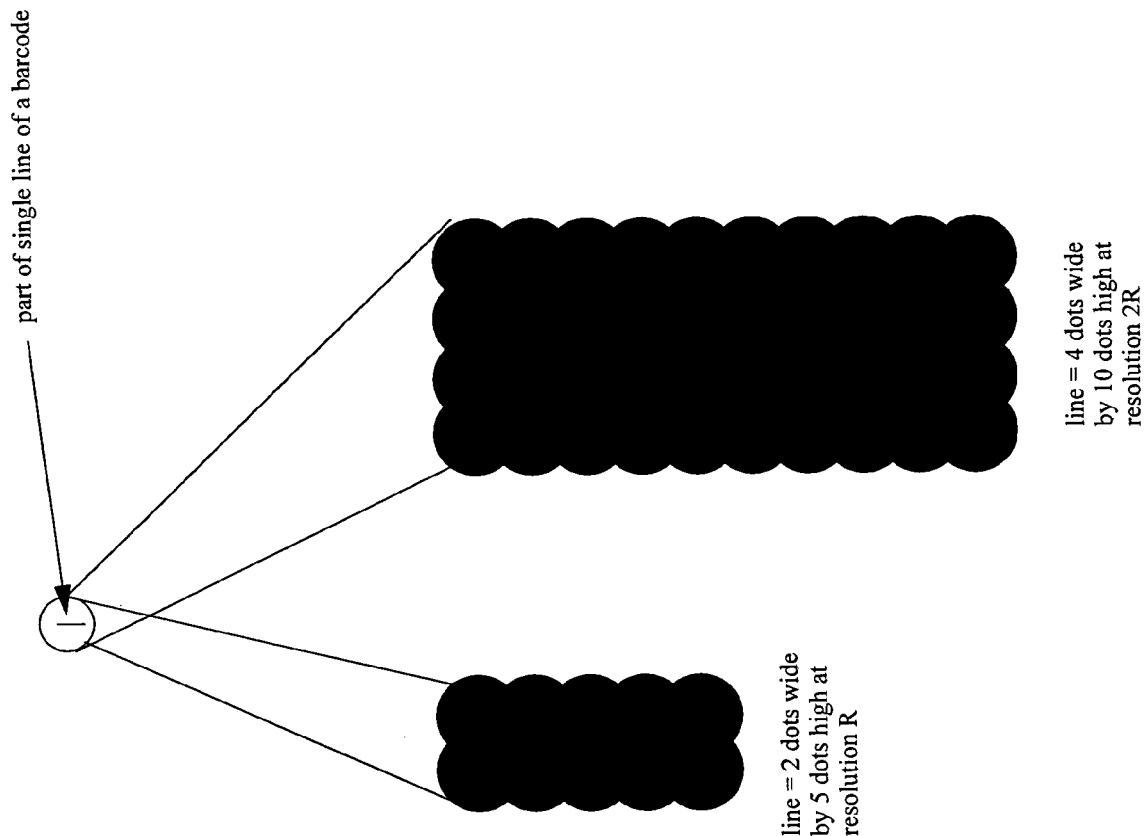
FIG. 5 shows the effect of output resolution on a tag component.

The data area contains the data for the tag. Depending on the tag's encoding format, a single bit of data may be represented by a number of physical printed dots. The exact number of dots will depend on the output resolution and the target reading/scanning resolution. FIG. 5 shows the effect of resolution on part of a line from a traditional barcode. When rendered at resolution R, a line part may be rendered as 2 dots wide by 5 dots high. The same line rendered at twice the resolution (2R) will be represented by twice as many dots in each dimension.

Figure 6:
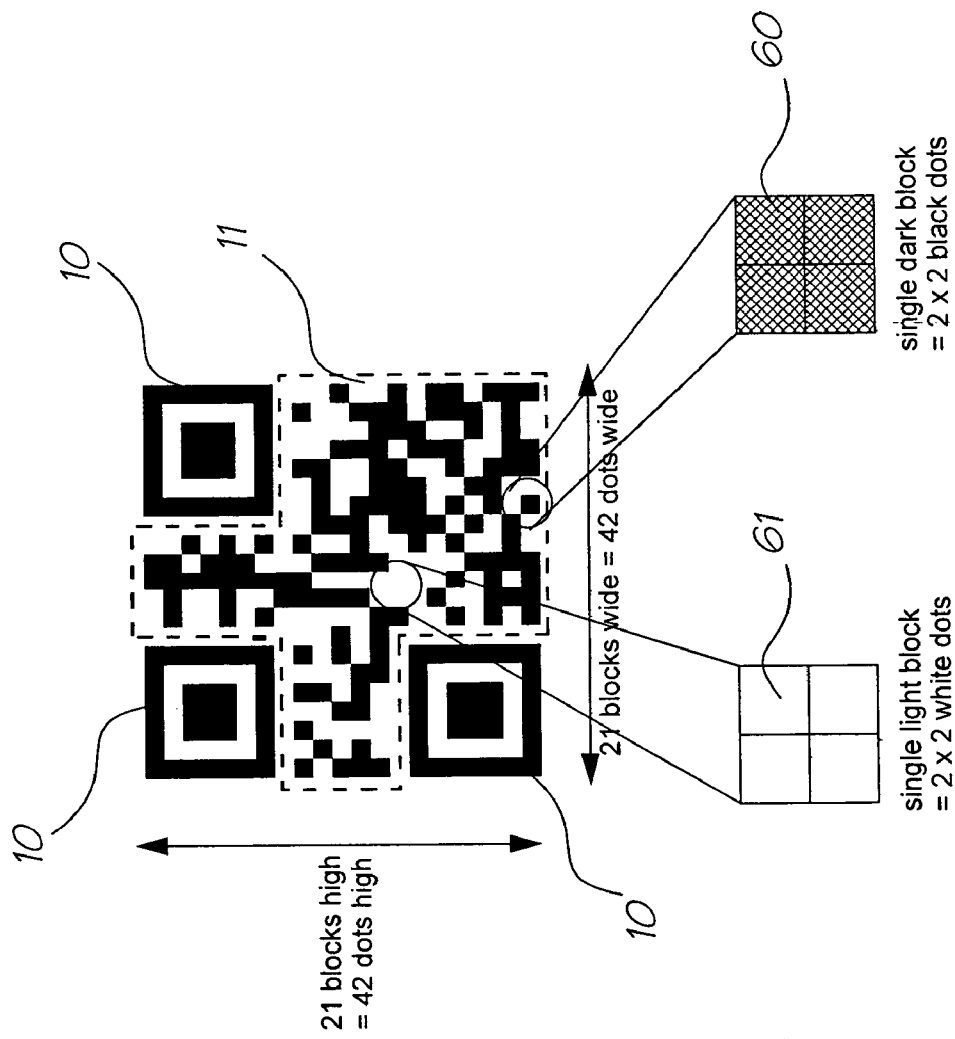
FIG. 6 shows the representation of data in a two dimensional quick response code.

As a further example, in the QR code shown in FIG. 1, a single bit is represented by a dark module or a light module, where the exact number of dots in the dark module or light module depends on the rendering resolution and target reading/scanning resolution. For example, and with reference to FIG. 6, a data module may be represented by a square block of printed dots (all on 60 for binary 1, or all off 61 for binary 0).

Here, a single bit of data may be represented in the printed tag by an arbitrary printed shape. The smallest shape is a single printed dot, while the largest shape is theoretically the whole tag itself. For example, a macrodot comprised of many printed dots in both dimensions.

An ideal generic tag definition structure allows the generation of an arbitrary printed shape from each bit of data.

Given an original number of bits of data, and the desire to place those bits into a printed tag for subsequent retrieval via a reading/scanning mechanism, the original number of bits can either be placed directly into the tag, or they can be redundacy-encoded in some way. The exact form of redundancy-encoding will depend on the tag format.

The placement of data bits within the data area of the tag is directly related to the rendundancy mechanism employed in the encoding scheme. Data bits may be placed together in 2D so that burst errors are averaged out over the tag data, thus typically being correctable. For example, all the bits of Reed-Solomon codewords would be spread out over the entire tag data area to minimize the potential effect of a burst error.

Since the data encoding scheme and shape and size of the tag data area are closely linked, it is desirable to have a generic tag format structure. This allows the same data structure and rendering embodiment to be used to render a variety of tag formats.

The Tag Format Structure (TFS) of the present invention is a dot based data package template. It allows the definition of an arbitrary shaped data package composed of dots and the definition of how the data itself is stored as dots within the data package. The TFS is optimised so that the tag can be rendered in real time. The TFS contains an entry for each dot position within the tag's bounding box. Each entry specifies whether the dot is part of the constant background patterns, which typically includes a constant position detection pattern, or part of the tag's data component.

The TFS is similar to a bitmap in that it contains one entry for each dot position within a bounding box of the tag. The TFS therefore has TagHeight×TagWidth entries, where TagWidth matches the size of the bounding box for the tag in the line dimension, and TagHeight matches the size of the bounding box for the tag in the dot dimension. A single line of TFS entries for a tag is called the tag line structure.

The TFS has the following parameters associated with it:

TagWidth is the width of the bounding box (in dots) for the tag;

TagHeight is the height of the bounding box (in dots) for the tag;

EntryWidth is number of bits in each entry of the TFS (minimum 2);

NumTagDataBits is the number of data bits associated with each tag (minimum 0).

To encode a specific tag instance, the data to be inserted into the tag needs to be supplied:

TagData is an array of NumTagDataBits bits containing the actual data to be stored in the tag data area. These bits have preferably already been redundancy encoded according to the tag encoding scheme.

Each entry in the TFS is interpreted according to the low order bit (bit 0):

If bit 0 is clear (=0), then the output dot for this entry is part of the constant background pattern. The dot value itself comes from bit 1. If bit 1=0, the output is 0, and if bit 1=1, then output value=1.

If bit 0 is set (=1), then the output dot for this entry comes from the TagData array. The remaining bits of the entry (bits 1 to NumTagDataBits-1) contain the address of the TagData bits that are to be used.

Each entry in the TFS is interpreted independently, and has no reliance on state information. This is important so that random access to the entries is possible, which may be necessary if multiple rendering engines are processing different parts of a page (e.g., a tag may be split across two or more rendering engines).

If the size of the printed dots are too small, the tag can be scaled in one of several ways. The tag itself may be scaled by N dots in each dimension, which increases the number of entries in the TFS. Alternatively, the output from the TFS generator can be scaled up by standard bitmap scaling techniques—for example, by pixel replication or averaging of supersamples.

For example, if the original TFS was 21×21 entries, and the scaling were a simple 2×2 dots for each of the original dots, the TFS could be increased to be 42×42. To generate the new TFS from the old, each entry across each line of the TFS would be repeated, and then each line of the TFS would be repeated. The net number of entries would be increased fourfold (2×2).

Figure 7:
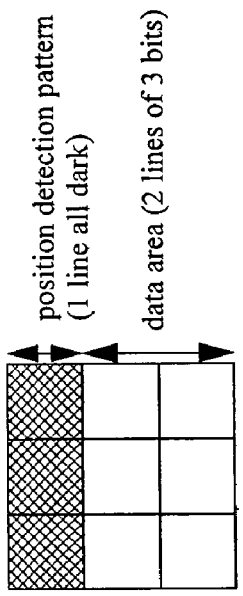
FIG. 7 shows a simple 3×3 tag structure.
Figure 8:
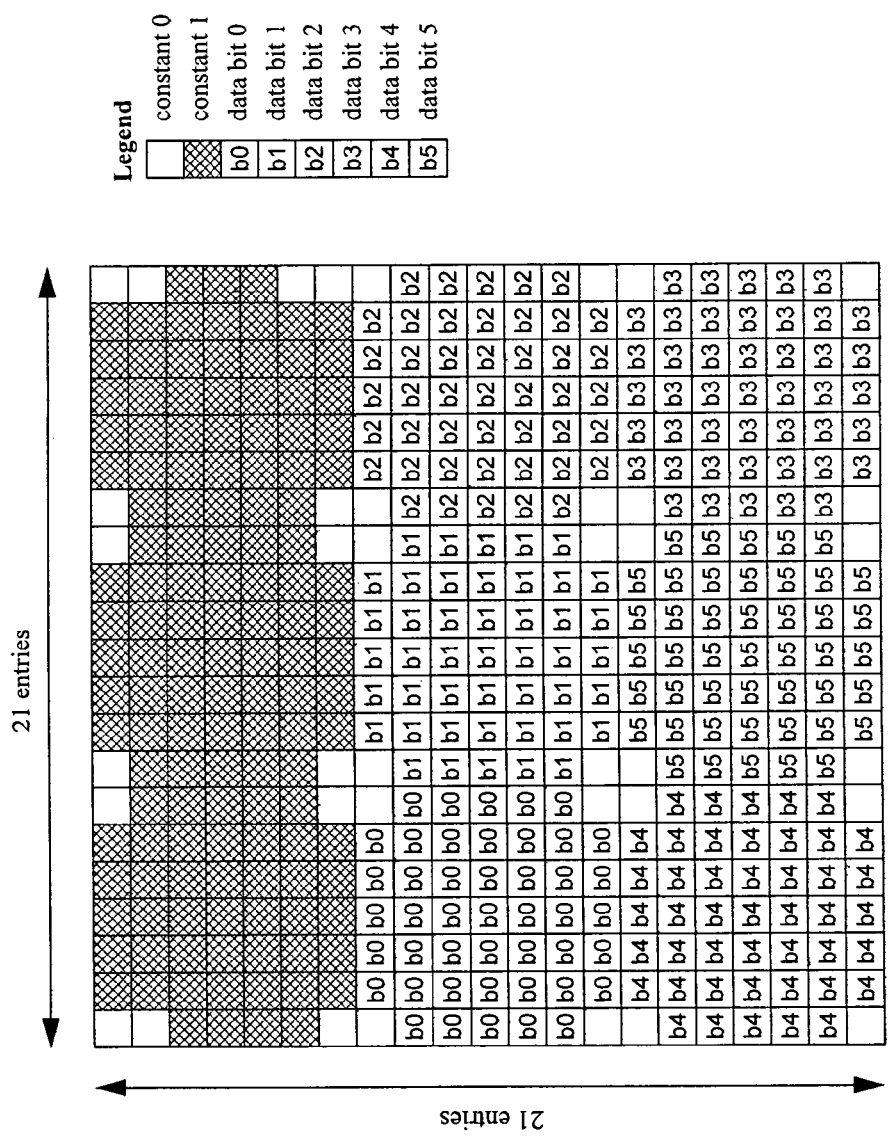
FIG. 8 shows a scaled up version of the tag of FIG. 7.

The TFS allows the creation of macrodots instead of simple scaling. With reference to FIG. 7 and the simple example of a 3×3 dot tag depicted therein, a physically large printed form of the tag may be desired, where, for example, each of the original dots may be represented by 7×7 printed dots. If replication by 7 is performed in each dimension of the original TFS (either by increasing the size of the TFS by 7 in each dimension or by placing a scale-up on the output of the tag generator output), 9 sets of 7×7 square blocks would be produced. Instead, each of the original dots in the TFS may be replaced by a 7×7 dot definition of a rounded dot. FIG. 8 shows the results.

Consequently, the higher the resolution of the TFS the more printed dots can be printed for each macrodot, where a macrodot represents a single data bit of the tag. The more dots that are available to produce a macrodot, the more complex the pattern of the macrodot can be. For example, FIG. 4 shows the Netpage tag structure rendered such that the data bits are represented by an average of 8 dots×8 dots (at 1600 dpi), but the actual structure of a dot is not square in shape. This allows the Netpage tag to be subsequently read at any orientation.

A very simple example is shown by the 9 dot tag of FIG. 7. There is a 3 dot constant back-ground pattern to aid locating the tag, and the remaining 6 dots are used for data. This means that we can store 6 bits of data in the tag.

However, let us assume that the 6 bits are actually only representative of 3 bits of original data, since the 3 original bits have been redundancy encoded by adding their inverse. For example, if the original 3 bits of data were 111, the 6 bits would be 101010. If the original 3 bits of data were 101, the resulting 6 bits would be 100110.

The relationship of dot positions in the tag was chosen to take account of the redundancy encoding of the data. In this simple example, the top line of the tag is always 111. The second line contains the first two data bits. Knowing the data encoding scheme, the first two bits must be inverses of each other. Consequently, a second line of 111 can never be achieved although 101, 011, 100 and 010 may be achieved. The same is true for the third line of the tag. Therefore, the constant pattern of 111 can not be achieved when the tag is produced, except in the pre-determined constant area.

The following parameters summarize the simple tag design:

TagWidth=3

TagHeight=3

EntryWidth=4(1+3, 1 for the low order bit, and 3 to index into the 6 data bits)

NumTagDataBits=6

With reference to FIG. 7, the first line of the TFS would be 0010, 0010, 0010 to represent 3 dots that are always on, regardless of the data being stored. The first entry of the second line in the TFS would be 0001 to indicate that the contents of bit 0 of the TagData array for this tag should be output at this dot position. The second entry of the second line would be 0011 for the bit 1 contents of the TagData array to be output at this dot position. The third entry of the second line in the TFS would be 0101 for the bit 2 contents.

The first entry of the third line in the TFS would be 1001 to indicate that the contents of bit 4 of the TagData array should be output at this dot position. Line 2, entry 2 would be 1011 for bit 5 and line 2, entry 3, in the TFS would be 0111 to indicate that whatever is stored in bit 3 of the TagData array for the tag should be output at this dot position.

Thus the entire TFS would be (arranged in entry order):

0010, 0010, 0010

0001, 0011, 0101

1001, 1011, 0111

Note that the codes 1101 and 1111 are never used since these would point to non-existant data bits 6 and 7 (we only have data bits 0–5).

Given the TFS just described, it is possible to produce a tag for any set of 6 bits. i.e. given a 6 bit length TagData array. If the 6 bits were 101010, the output from the tag encoder in the 9 bit positions would be:

1 (constant)
1 (constant)
1 (constant)
1 (from data bit 0)
0 (from data bit 1)
1 (from data bit 2)
1 (from data bit 4)
0 (from data bit 5)
0 (from data bit 3)

If the 6 bits were 100110, the output from the tag encoder in the 9 bit positions would be:

1 (constant)
1 (constant)

1 (constant)
1 (from data bit 0)
0 (from data bit 1)
0 (from data bit 2)
1 (from data bit 4)
0 (from data bit 5)
1 (from data bit 3)

With reference to FIG. 1 again, the sample QR code tag is 21 blocks by 21 blocks. If each block was comprised of a single dot, then the QR code tag is 21 dots×21 dots. In addition, there are 249 data blocks in the data area, representing 249 bits. The basic parameters of TagWidth and TagHeight can now both be set to=21. EntryWidth=9(1+8, 1 for the low order bit, and 8 to index into the 249 data bits). NumTagDataBits=249. Thus, the Tag Format Structure would be a total of 441 entries (21×21), with each entry being 9 bits. The first 7 entries would be 000000010 to define an output dot constant of 1, and entry 8 would be 000000000 to define an output dot constant of 0. The next entry would be xxxxxxxx1, where xxxxxxxx is the address of the bit number that represents the 9th block on the first line. If the block comes from bit 129 of the 249 data bits, then xxxxxxxx will be 10000001. If the block comes from bit 62 of the 249 data bits, then xxxxxxxx will be 00111110. There would be a total of 5 of these data reference entries, followed by 000000000, and 7 entries of 000000010 to finish the line.

The second line of the Tag Format Structure would be 00000010 followed by 5 entries of 000000000, one entry of 00000010, and one entry of 000000000 to represent the 8 constant data output dots of 1, 0, 0, 0, 0, 0, 1, and 0 respectively. There would then be 5 entries of data references pointing to the various bits of the 249 data bits for the 2nd row of the tag.

The final line of the Tag Format Structure would be 7 entries of 00000010, one entry of 000000000, and then 13 entries pointing to various data bits that are in the final row of the tag. TagData is an array of 249 bits containing the actual data to be stored in the tag data area. These bits must have already been redundacy encoded according to the QR tag encoding scheme.

The Tag Format Structure of the present invention may be implemented in a Tag Encoder of the type disclosed in the aforementioned copending U.S. patent application Ser. No. 09/575,109. The operation of the Tag Encoder is briefly summarized herein.

The Tag Encoder (TE) provides functionality for tag-enabled applications, and it typically requires the presence of IR ink at the print head (although K ink or an alternative might be used for tags in limited circumstances). The TE encodes fixed data for the page being printed, together with specific tag data values into an error-correctable encoded tag which is subsequently printed in infrared or black ink on the page. The TE might place tags on a triangular grid allowing for both landscape and portrait orientations. Basic tag structures are rendered at 1600 dpi, while tag data might be encoded as arbitrarily shaped macrodots (with a minimum size of 1 dot at 1600 dpi).

The TE takes the following as input:

A portrait/landscape flag;
A template defining the structure of a single tag;
A number of fixed data bits (fixed for the page);
A flag that defines whether or not to redundantly encode the fixed data bits or whether to treat the bits as already having been encoded;
A number of variable data bit records, where each record contains the variable data bits for the tags on a given line of tags;
A flag that defines whether or not to redundantly encode the variable data bits or whether to treat the bits as already having been encoded.

The output from the tag encoder (TE) is a 1600 dpi bi-level layer of where tag data should be printed. The output is via a 1-bit wide FIFO. The tags are subsequently preferably printed with an infrared-absorptive ink that can be read by a tag sensing device.

Even though the conceptual implementation of the tag encoder (TE) allows tags to have a variable structure as well as fixed and variable data components, the TE does impose range restrictions on certain encoding parameters. However, these restrictions are a direct result of buffer sizes and the number of addressing bits, chosen for the most likely encoding scenarios. It is a simple matter to adjust the buffer sizes and corresponding addressing to allow arbitrary encoding parameters in other implementations.

The TE writes a bi-level tag bitstream to the bi-level tag FIFO. The TE is responsible for merging the encoded tag data with the basic tag structure, and placing the dots in the output FIFO in the correct order for subsequent printing. The encoded tag data is generated from the original data bits on-the-fly to minimize buffer space.

The TagData array is divided into fixed and variable components. For example, if a tag holds 512 bits of data, some of these bits may be fixed for all tags. Some may vary from tag to tag. For example, the Universal product code allows a country code and a company code. Since these bits don't change from tag to tag, these bits can be preloaded into the tag generator in order to reduce the bandwidth when producing many tags. Another example is a Netpage tag generator. A single printed page contains a number of Netpage tags of the form shown in FIGS. 2–4. The page-ID will be constant across all the tags, even though the remainder of the data within each tag may be different for each tag. By reducing the amount of variable data being passed to the tag encoder for each tag, the overall bandwidth to the encoder can be reduced.

Depending on the embodiment of the encoder, these parameters will be either implicit or explicit, and may limit the size of tags renderable by the system. For example, a software tag encoder may be completely variable, while a hardware tag encoder may have a maximum number of tag data bits.

Instead of accepting the complete number of TagData bits encoded by an external encoder, a tag encoder could accept the basic non-redundancy-encoded data bits and encode them as required for each tag. This can lead to significant savings of bandwidth. In the Netpage tag case, as described in copending U.S. patent application Ser. No. 09/575,109, only 120 bits of original data are provided per tag, and the tag encoder encodes these 120 bits into 360 bits. By having the redundancy encoder on board the tag encoder the effective bandwith required is reduced by ⅔.

In the description of the TFS above, bit 0 defines whether the output dot is stored immediately with the entry (bit 1 contains the output bit value) or whether the higher bits form the address to look up the TagData structure. It is a trivial change to use different bit positioning to represent the same information.

To reduce storage requirements for certain types of tags, the TFS can use double indirection. In the above description, when bit 0 of the TFS entry is set, the high order bits form the address of the bit from the TagData array to be used. However, if the total number of entries in the TFS is large, and the maximum number of different bits for a given line of the TFS is comparatively smaller than NumTagDataBits, then it can be convenient to use double indirection.

Using double indirection, the data-address entries of the TFS point into a second array, stored at the end of the TFS line. The second array contains the actual address within the TagData array to use. For example, if there are only ever 8 different data bits used on a given line of a tag, the EntryWidth may be set to 4 (1 bit to determine whether or not it is necessary to look up the data bit or whether to use bit 1 directly). If bit 0 is 1, then bits 1–3 are used to form an address 0–7. The address looks up a table of 8 n-bit entries that point into the TagData array. If there are 512 entries in the TagData array, then n=9. If TagWidth=100, then the basic encoding would have used 1000 bits (100×10 bits) for each line of the TFS. If double indirection is used, and there are only ever 8 different data bits used on a given line of a tag, then each line of the TFS will require 472 bits (100×4 bits+8×9 bits). The saving is about 50% which may be a valuable factor, depending on the application.

Another modification is to change from bi-level output to contone output. In the present invention, each output dot is usually either on or off. If bit 0=0, then bit 1 contains the output bit to use. This can readily be extended to form a larger number of bits. For example, if 4-bit contone printing is desired, i.e., if bit 0=0, then the output is 4 bits formed by bits 1–3. Of course, the EntryWidth would need to be increased appropriately. Likewise, the address pointing to the TagData array would be pointing to the nth entry, where, instead of the entry being a single bit, it would be a plurality of bits (depending on the number of bits in each contone output dot).

If the complete TFS is stored locally, e.g. on the chip, it can be accessed either row-wise or column-wise to provide for landscape and portrait orientations. If the tag format structure is not stored locally (e.g. in off-chip memory), and is accessed one line-at-a-time, it is preferable to have two copies of the structure—one for landscape, and one for portrait printing. For example, in co-pending U.S. patent application Ser. No. 09/575,109, the tag encoder is on an ASIC, while the TFS is in an external DRAM. To reduce storage on-board the ASIC, only the current line of the TFS is loaded at a time. Since the access to the TFS is line based, there needs to be two TFS structures stored in the external DRAM—one for portrait orientation, and one for landscape orientation printing. Theoretically they could be arbitrarily different. In practice however, they are the same TFS rotated through 90 degrees.

Throughout the specification the aim has been to describe the preferred embodiments of the present invention without limiting the invention to any one embodiment or specific collection of features. Persons skilled in the relevant art may realize variations from the specific embodiments that will nonetheless fall within the scope of the invention.

The invention claimed is:

1. A method for generating tags embedded with data, comprising the steps of:
    printing, using an encoder, a tag having a data area comprising data dots and a locator component comprising constant dots;
    using the tag encoder to obtain tag data from a tag format structure, the tag format structure being a dot based data package template containing a plurality of entries, there being an entry associated with each dot's position, an entry indicating whether a data dot or a constant dot, accordingly each entry having either fixed data bits or variable data bits.

2. The method of claim 1, wherein:
    each entry of the tag format structure comprises bits including a selected bit and the entry is interpreted as indicating a data bit, or not, according to the selected bit.

3. The method of claim 2, further comprising the step of:
    determining if the selected bit indicates that the entry is data, then interpreting a remainder of the entry as an address.

4. The method of claim 1, further comprising the step of:
    interpreting each entry independently without reliance on state information.

5. The method of claim 1, wherein the tag format structure is comprised of one or more lines and further comprising the steps of:
    scaling the tag by a factor of N, by scaling the number of entries in the tag format structure; and
    scaling the tag format structure by replication of each entry N times and by replication of each line N times.

6. The method of claim 1, wherein printing the data and constant dots comprises:
    printing each dot as a macrodot generated from the tag format structure.

7. The method of claim 1, further comprising the step of:
    providing a tag format structure in which dot positions have a relationship and the relationship takes into account a redundancy encoding of the data.

8. The method of claim 1, further comprising the steps of:
    using the tag encoder to redundantly encode the data bits to conserve bandwidth.

9. The method of claim 1, further comprising the step of:
    redundantly encoding entries in the tag format structure.

10. The method of claim 1, further comprising the step of:
    providing the encoder with an input which defines the structure of a tag.

11. The method of claim 1, further comprising the step of:
    providing the encoder with an input which defines whether or not to redundantly encode the variable data bits or to treat the variable data bits as having been encoded.

12. The method of claim 1, further comprising the step of:
    providing the encoder with an input which defines whether or not to redundantly encode the fixed data bits or to treat the fixed data bits as having been encoded.

13. The method of claim 1, further comprising the step of:
    providing the encoder with an input comprising a number of variable data bit records, each record contains one or more variable data bits for the one or more tags on a given line of tags.

14. The method of claim 1, further comprising the step of:
    printed the tags with an infrared absorptive ink that can be read with a tag sensing device.

15. The method of claim 1, further comprising the step of:
    using the encoder to merge encoded tag data with a basic tag structure and place dots in an output FIFO in a correct order for subsequent printing.

16. The method of claim 1, further comprising the step of:
    generating encoded tag data from original data bits on-the-fly to minimize buffer space.

17. The method of claim 1, further comprising the step of:
    printing each tag so as to have a background pattern further comprising a locator component.

18. The method of claim 17, wherein:
    the locator component is circular.

19. The method of claim 9, further comprising the step of:
    performing the encoding using double indirection encoding.

20. The method of claim 1, further comprising the step of:
    printing the dots as continuous tone dots.

* * * * *